United States Patent
Sugiyama

(10) Patent No.: US 9,377,665 B2
(45) Date of Patent: Jun. 28, 2016

(54) OPTICAL MODULATOR HAVING A 2×2 COUPLER

(71) Applicant: Fujitsu Optical Components Limited, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 161 days.

(21) Appl. No.: 14/250,760

(22) Filed: Apr. 11, 2014

(65) Prior Publication Data

US 2014/0355924 A1 Dec. 4, 2014

(30) Foreign Application Priority Data

May 31, 2013 (JP) .................................. 2013-115011

(51) Int. Cl.
*G02F 1/225* (2006.01)
*G02F 1/21* (2006.01)

(52) U.S. Cl.
CPC .......... *G02F 1/225* (2013.01); *G02F 2001/212* (2013.01)

(58) Field of Classification Search
CPC ............................ G02F 2001/212; G02F 1/225
USPC ........................................................ 385/2–24
See application file for complete search history.

(56) References Cited

U.S. PATENT DOCUMENTS

| 5,488,681 | A | * | 1/1996 | Deacon | G02F 1/2955 385/37 |
|---|---|---|---|---|---|
| 5,544,268 | A | * | 8/1996 | Bischel | G02F 1/011 385/16 |
| 7,773,883 | B1 | * | 8/2010 | Weng | H04J 14/0208 398/3 |
| 2006/0159384 | A1 | | 7/2006 | Sugiyama | |
| 2008/0002926 | A1 | | 1/2008 | Kondou et al. | |
| 2008/0260321 | A1 | | 10/2008 | Sugiyama | |
| 2010/0021166 | A1 | * | 1/2010 | Way | H04J 14/02 398/79 |
| 2010/0215072 | A1 | * | 8/2010 | Funabashi | G02B 6/42 372/50.12 |

FOREIGN PATENT DOCUMENTS

| JP | 2006-195256 | 7/2006 |
|---|---|---|
| JP | 2006-301612 | 11/2006 |
| JP | 2009-157114 | 7/2009 |

* cited by examiner

*Primary Examiner* — Akm Enayet Ullah
(74) *Attorney, Agent, or Firm* — Staas & Halsey LLP

(57) ABSTRACT

An optical modulator includes: a substrate that has electrooptical effect and has a Mach-Zehnder modulator that has a 2×2 coupler acting as a splitter, two intermediate waveguides coupled to outputting waveguides of the splitter and another 2×2 coupler acting as a combiner coupled to the two intermediate waveguides; and a suppresser that suppresses a power of an output light from an uncoupled waveguide and an input light into the uncoupled waveguide of at least one of the 2×2 couplers in an extending direction of the Mach-Zehnder modulator.

12 Claims, 11 Drawing Sheets

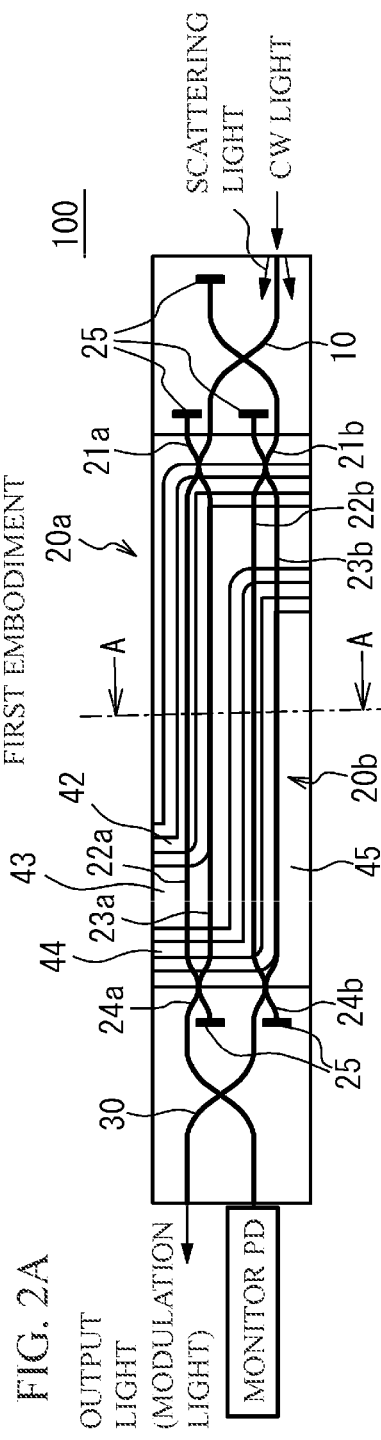
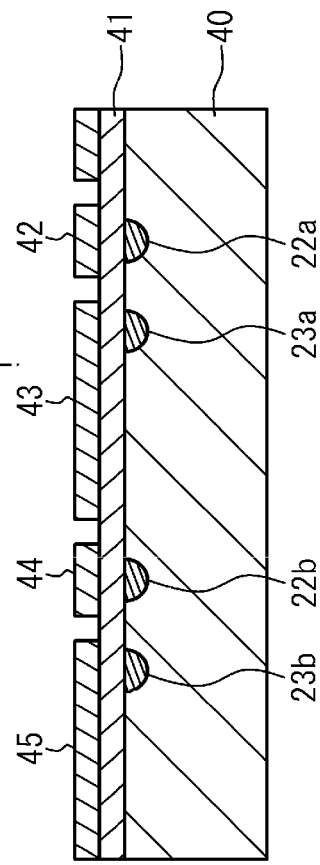
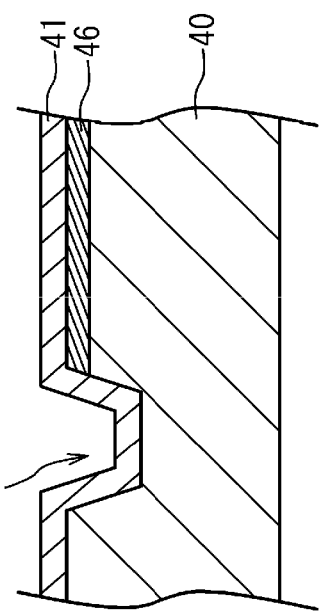
FIG. 2A
FIG. 2B
FIG. 2C

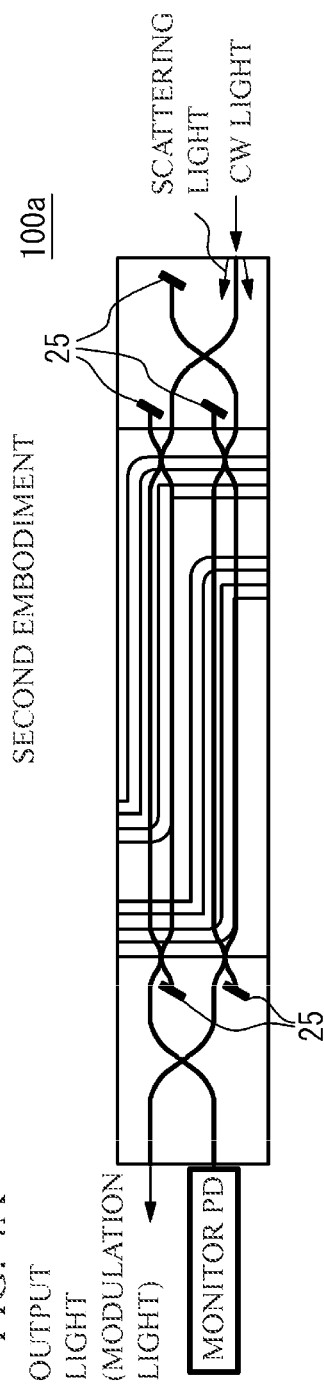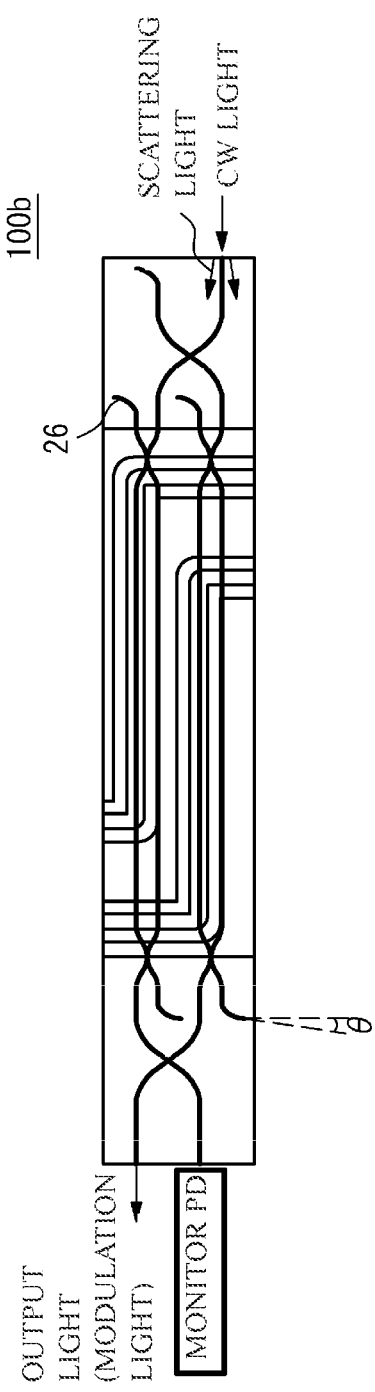
FIG. 4A  SECOND EMBODIMENT
FIG. 4B  THIRD EMBODIMENT

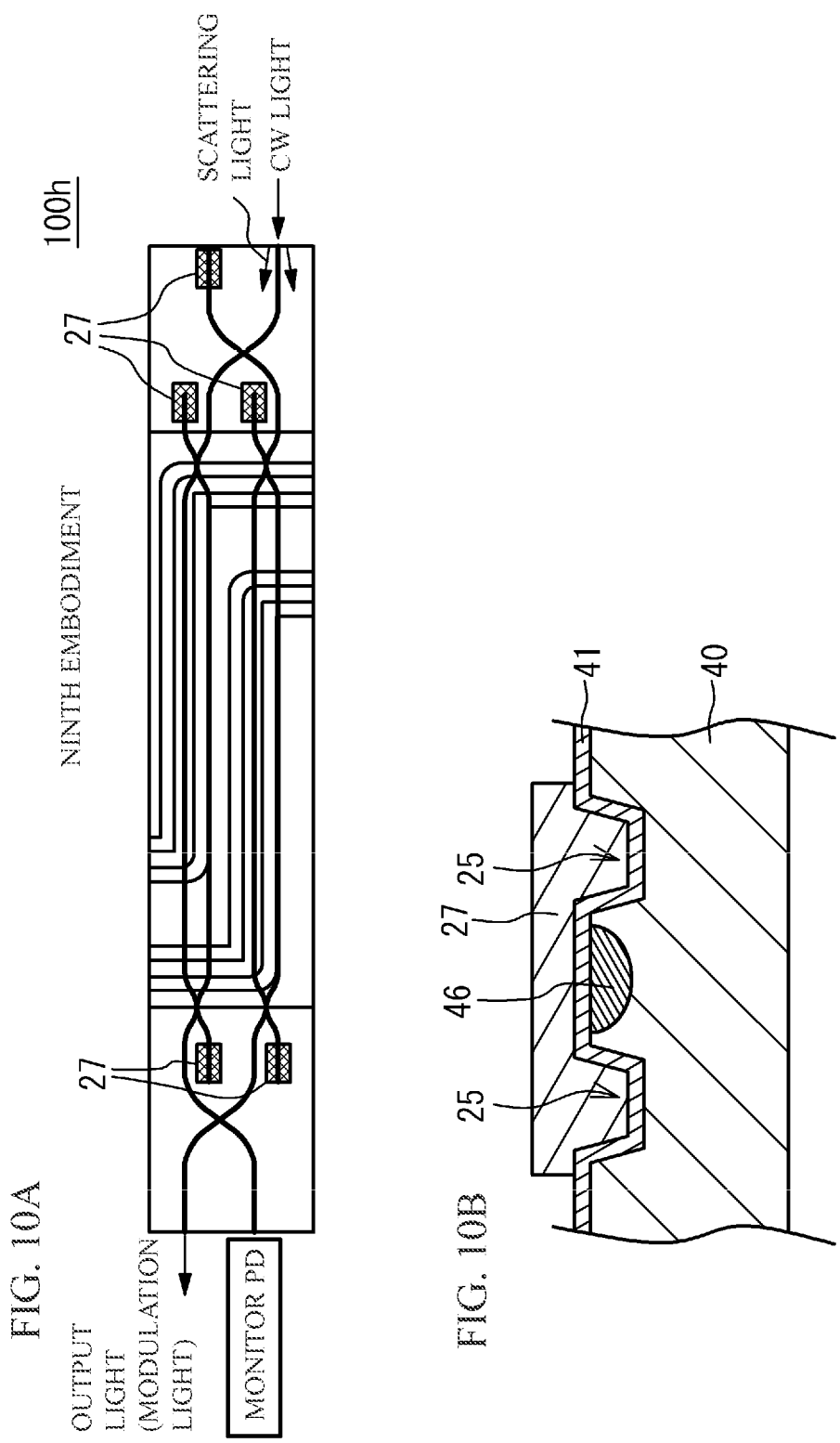

OPTICAL MODULATOR HAVING A 2×2 COUPLER

CROSS-REFERENCE TO RELATED APPLICATION

This application is based upon and claims the benefit of priority of the prior Japanese Patent Application No. 2013-115011, filed on May 31, 2013, the entire contents of which are incorporated herein by reference.

FIELD

A certain aspect of embodiments described herein relates to an optical modulator.

BACKGROUND

An optical waveguide device using an electrooptical crystal such as a $LiNbO_3$ (LN) substrate, a $LiTaO_3$ substrate or the like is being developed. These optical waveguide devices may be formed through processes of providing an electrode near an optical waveguide after forming the optical waveguide by forming a metal film such as Ti on a part of a crystal substrate and thermally diffusing the metal film or by proton-exchanging in benzoic acid after patterning. Japanese Patent Application Publications No. 2009-157114, No. 2006-301612 and No. 2006-195256 disclose a Mach-Zehnder optical modulator as the optical waveguide device.

SUMMARY

According to an aspect of the present invention, there is provided an optical modulator comprising: a substrate that has electrooptical effect and has a Mach-Zehnder modulator that has a 2×2 coupler acting as a splitter, two intermediate waveguides coupled to outputting waveguides of the splitter and another 2×2 coupler acting as a combiner coupled to the two intermediate waveguides; and a suppresser that suppresses a power of an output light from an uncoupled waveguide and an input light into the uncoupled waveguide of at least one of the 2×2 couplers in an extending direction of the Mach-Zehnder modulator.

According to another aspect of the present invention, there is provided an optical modulator comprising: a substrate that has electrooptical effect and has a plurality of Mach-Zehnder modulators that have a 2×2 coupler acting as a splitter, two intermediate waveguides coupled to outputting waveguides of the splitter and a 2×2 coupler acting as a combiner coupled to the two intermediate waveguides, a 2×2 coupler that is coupled to the splitter of the Mach-Zehnder modulators and a 2×2 coupler that is coupled to the combiner of the Mach-Zehnder modulators; and a suppresser that suppresses a power of an output light from an uncoupled waveguide and an input light into the uncoupled waveguide of at least one of the 2×2 couplers in an extending direction of the Mach-Zehnder modulator.

BRIEF DESCRIPTION OF DRAWINGS

FIG. 2A illustrates a schematic plane view for describing an optical modulator in accordance with a first embodiment;

FIG. 2B illustrates a cross sectional view taken along a line A-A of FIG. 2A;

FIG. 2C illustrates a cross sectional view of a groove;

FIG. 4A illustrates a schematic plane view for describing an optical modulator in accordance with a second embodiment;

FIG. 4B illustrates a schematic plane view for describing an optical modulator in accordance with a third embodiment;

FIG. 10A illustrates a schematic plane view for describing an optical modulator in accordance with a ninth embodiment;

FIG. 10B illustrates a cross sectional view around an uncoupled waveguide; and

DESCRIPTION OF EMBODIMENTS

Figure 1A:
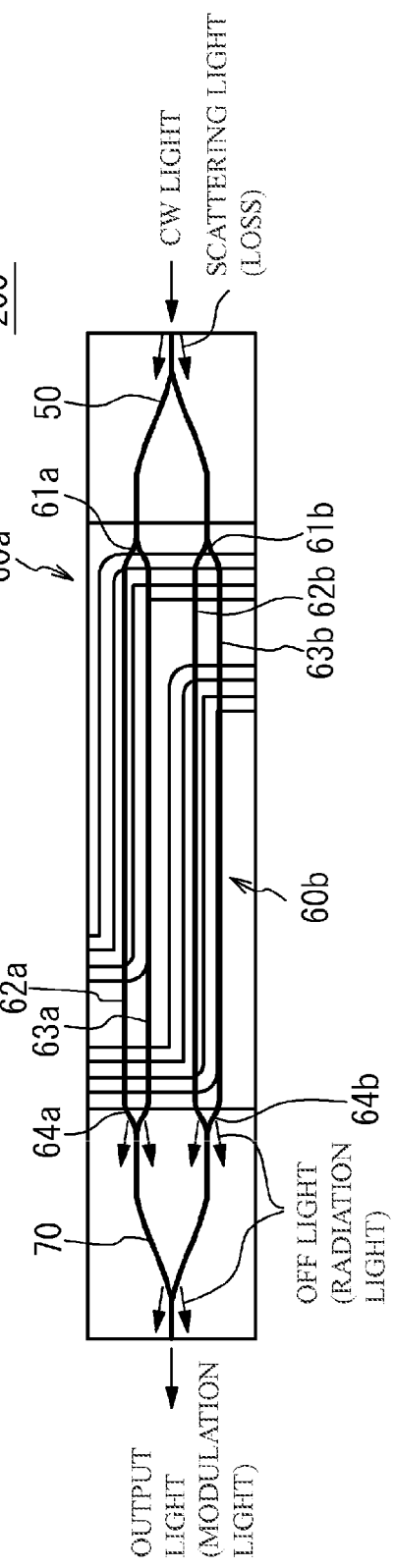
FIG. 1A illustrates a schematic plane view for describing an optical modulator in accordance with a first comparative example.

A description will be given of an optical modulator having a Mach-Zehnder modulator before describing embodiments. FIG. 1A illustrates a schematic plane view for describing an optical modulator 200 in accordance with a first comparative example. As illustrated in FIG. 1A, the optical modulator 200 has a splitter 50, a first Mach-Zehnder modulator 60a, a second Mach-Zehnder modulator 60b and a combiner 70. The first Mach-Zehnder modulator 60a has a splitter 61a, intermediate waveguides 62a and 63a, and a combiner 64a. The second Mach-Zehnder modulator 60b has a splitter 61b, intermediate waveguides 62b and 63b and a combiner 64b.

The splitter 50 is provided at an inputting end of the optical modulator 200 and branches in a Y-shape. The splitter 61a is coupled to one of branched waveguides on an output side of the splitter 50, and branches in a Y-shape. One of branched waveguides on an output side of the splitter 61a is coupled to a first end of the intermediate waveguide 62a. The other branched waveguide on the output side of the splitter 61a is coupled to a first end of the intermediate waveguide 63a. The intermediate waveguides 62a and 63a are in parallel with each other. Second ends of the intermediate waveguides 62a and 63a are combined in a Y-shape by the combiner 64a.

The splitter 61b is coupled to the other branched waveguide on the output side of the splitter 50, and branches in a Y-shape. One of branched waveguide on an output side of the splitter 61b is coupled to a first end of the intermediate waveguide 62b. The other branched waveguide on the output side of the splitter 61b is coupled to a first end of the intermediate waveguide 63b. The intermediate waveguides 62b and 63b are in parallel with each other. Second ends of the intermediate waveguides 62b and 63b are combined in a Y-shape by the combiner 64b. A waveguide after combining of the combiner 64a and a waveguide after combining of the combiner 64b are combined by the combiner 70.

A branch ratio may be different from 1:1, when a Y-shaped waveguide does not have a symmetrical structure, a plurality of Y-shaped waveguides are provided, an inputting end face or an outputting end face is provided obliquely, and so on. An extinction ratio may be degraded in a Mach-Zehnder modulator, when a branch ratio of a Y-shaped splitter on an input side is different from that of another Y-shaped splitter on an output side. In order to solve the problem, a 2×2 coupler may be used as a splitter and a combiner.

Figure 1B:
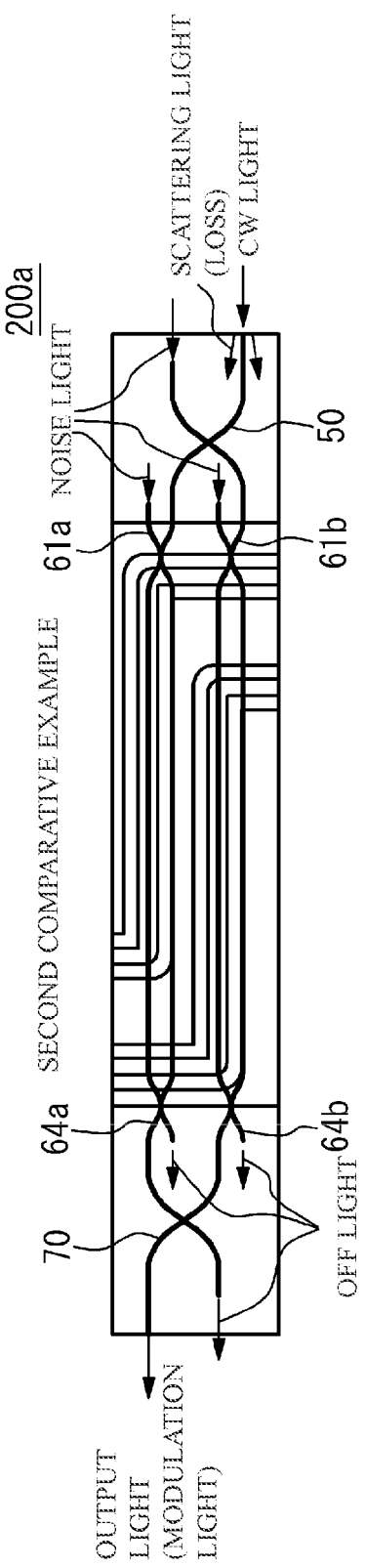
FIG. 1B illustrates a schematic plane view for describing an optical modulator in accordance with a second comparative example.

FIG. 1B illustrates a schematic plane view for describing an optical modulator 200a in accordance with a second comparative example. As illustrated in FIG. 1B, the optical modulator 200a is different from the optical modulator 200 in a point that a 2×2 coupler is used instead of the Y-shaped waveguide as the splitters 50, 61a and 61b and the combiners 64a, 64b and 70. In the structure, it is possible to adjust a branch ratio by adjusting an angle of a waveguide, a length of a combiner or the like. Thus, a branch ratio on the input side can be equal to another branch ratio on the output side. It is therefore possible to solve the problem of the above-mentioned degradation of the extinction ratio.

However, when the 2×2 coupler is used, a waveguide that is not coupled to another waveguide (hereinafter referred to as an uncoupled waveguide) is open. An unnecessary light from the uncoupled waveguide, a noise light into the uncoupled waveguide or the like causes the degradation of the extinction ratio. In the optical modulator 200 of FIG. 1A, even if a part of an input CW light (a loss) that cannot be coupled to the waveguide at the inputting end face becomes a scattering light, the scattering light does not enter the Y-shaped splitters 50, 61a and 61b. An OFF light (a radiation light) that is generated by a modulating moves toward a substrate. Therefore, the OFF light is not mixed with an output light. On the other hand, in the optical modulator 200a of FIG. 1B, a part of the scattering light at the inputting end may enter the uncoupled waveguide of the 2×2 coupler. And, the OFF light emitted from the uncoupled waveguide of the 2×2 coupler may propagate near a surface of the substrate and may be mixed with the output light. Therefore, there may be a problem that the extinction ration is degraded. The problem gets larger when two Mach-Zehnder modulators are provided as well as the optical modulator 200a. The problem gets much larger when the number of the Mach-Zehnder modulator increases to three or four. And so, a description will be given of an optical modulator that is capable of suppressing the degradation of the extinction ratio in the following embodiments.

First Embodiment

FIG. 2A illustrates a schematic plane view for describing an optical modulator 100 in accordance with a first embodiment. FIG. 2B illustrates a cross sectional view taken along a line A-A of FIG. 2A. FIG. 2C illustrates a cross sectional view of a groove 25 described later. As illustrated in FIG. 2A and FIG. 2B, the optical modulator 100 has a substrate 40 including a splitter 10, a first Mach-Zehnder modulator 20a, a second Mach-Zehnder modulator 20b and a combiner 30. The substrate 40 is an electrooptical substrate including an electrooptical crystal such as $LiNbO_3$ (LN) substrate or $LiTaO_3$ substrate. The splitter 10, the first Mach-Zehnder modulator 20a, the second Mach-Zehnder modulator 20b and the combiner 30 are formed through thermal diffusion of a metal such as Ti into the substrate 40.

The first Mach-Zehnder modulator 20a has a splitter 21a, intermediate waveguides 22a and 23a, and a combiner 24a. The second Mach-Zehnder modulator 20b has a splitter 21b, intermediate waveguides 22b and 23b, and a combiner 24b. The splitter 10 is a 2×2 coupler. One of inputting waveguides of the splitter 10 is provided at an inputting end of the optical modulator 100.

The splitters 21a and 21b are a 2×2 coupler. One of branched waveguides on an output side of the splitter 10 is coupled to one of inputting waveguides on an input side of the splitter 21a. The other branched waveguide on the output side of the splitter 10 is coupled to one of inputting waveguides on an input side of the splitter 21b. One of branched waveguides on an output side of the splitter 21a is coupled to a first end of the intermediate waveguide 22a. The other branched waveguide on the output side of the splitter 21a is coupled to a first end of the intermediate waveguide 23a. One of branched waveguides on an output side of the splitter 21b is coupled to a first end of the intermediate waveguide 22b. The other branched waveguide on the output side of the splitter 21b is coupled to a first end of the intermediate waveguide 23b.

The combiner 24a is a 2×2 coupler. A second end of the intermediate waveguide 22a is coupled to one of inputting waveguides on an input side of the combiner 24a. A second end of the intermediate waveguide 23a is coupled to the other inputting waveguide on the input side of the combiner 24a. The combiner 24b is a 2×2 coupler. A second end of the intermediate waveguide 22b is coupled to one of inputting waveguides on an input side of the combiner 24b. A second end of the intermediate waveguide 23b is coupled to the other inputting waveguide on the input side of the combiner 24b.

The combiner 30 is a 2×2 coupler. One of branched waveguides on an output side of the combiner 24a is coupled to one of inputting waveguides on an input side of the combiner 30. One of branched waveguides on an input side of the combiner 24b is coupled to the other inputting waveguide on the input side of the combiner 30. One of branched waveguides on an output side of the combiner 30 is coupled to an outputting end of the optical module for outputting a modulation light. The other branched waveguide on the output side of the combiner 30 may be open. In the embodiment, the other branched waveguide on the output side of the combiner 30 is coupled to an outputting end of the optical modulator 100 for monitoring.

As illustrated in FIG. 2B, there is provided a buffer layer 41 on a face of the substrate 40 on an optical waveguide side. Thus, each optical waveguide of the optical modulator 100 is covered by the buffer layer 41. The buffer layer 41 is provided to prevent absorption of a light propagating in the optical waveguide into an electrode described later. The buffer layer 41 is, for example, made of $SiO_2$ or the like having a thickness of 0.2 μm to 2 μm.

A signal electrode 42 is provided above the intermediate waveguide 22a. The buffer layer 41 is located between the intermediate waveguide 22a and the signal electrode 42. A ground electrode 43 is provided above the intermediate waveguide 23a. The buffer layer 41 is located between the intermediate waveguide 23a and the ground electrode 43. Thus, the signal electrode 42 and the ground electrode 43 form a coplanar electrode. A signal electrode 44 is provided above the intermediate waveguide 22b. The buffer layer 41 is located between the intermediate waveguide 22b and the signal electrode 44. A ground electrode 45 is provided above the intermediate waveguide 23b. The buffer layer 41 is located between the intermediate waveguide 23b and the ground electrode 43. Thus, the signal electrode 44 and the ground electrode 45 form a coplanar electrode. The signal electrodes 42 and 44 and the ground electrodes 43 and 45 are provided directly above the intermediate waveguides in order to use refraction index changing caused by an electrical field in a Z-direction, if a Z-cut substrate is used as the substrate 40.

In the first Mach-Zehnder modulator 20a, a traveling-wave electrode is structured by coupling a dead end of the signal electrode 42 to a dead end of the ground electrode 43 through a resistor, and a microwave signal is applied to the traveling-wave electrode from an inputting side. In this case, refraction index of the intermediate waveguides 22a and 23a changes by +Δn or −Δn according to the generated electrical field. Thus, a phase difference between the intermediate waveguides 22a and 23a changes, and a Mach-Zehnder interference is established. Accordingly, an intensity-modulated optical signal is output from the combiner 24a. An effective refraction index of the microwave may be controlled by changing a cross section shape of the traveling-wave electrode. High-speed optical responsiveness may be obtained by matching the speed of the optical signal and that of the microwave. In the second Mach-Zehnder modulator 20b, a travelling-wave electrode is structured by coupling dead ends of the signal electrode 44 and the ground electrode 45 through a resistor. A micro wave signal is applied to the travelling-wave electrode from the inputting side. Thus, an intensity-modulated optical signal is output from the combiner 24b.

Output signals of the first Mach-Zehnder modulator 20a and the second Mach-Zehnder modulator 20b are combined and output by the combiner 30. A QPSK signal can be generated by driving the first Mach-Zehnder modulator 20a and the second Mach-Zehnder modulator 20b with different signals and adjusting phases of the output lights of the Mach-Zehnder modulators 20a and 20b so that a difference between the phases is equal to 90 degrees.

In the embodiment, the splitters 10, 21a and 21b and the combiners 24a, 24b and 30 are not a Y-shaped waveguide but a 2×2 coupler. In this case, it is possible to adjust a branch ratio by adjusting an angle of a waveguide, a length of a combiner or the like. It is thereby possible to equalize branch ratios of the input side and the output side. It is therefore possible to suppress the degradation of the extinction cause by the branch ratio.

In the embodiment, as illustrated in FIG. 2C, the groove 25 is formed in an uncoupled waveguide 46 of the splitters 10, 21a and 21b and the combiners 24a and 24b. In concrete, the groove 25 crosses an open end of the uncoupled waveguide 46. In this case, a light scatters between the uncoupled waveguide 46 and the groove 25 because of a refraction index difference between the uncoupled waveguide 46 and the buffer layer 41, a refraction index difference between the uncoupled waveguide 46 and air or the like. For example, a light output from the uncoupled waveguide 46 or a light input into the uncoupled waveguide 46 is reflected at an interface between the groove 25 and the uncoupled waveguide 46. That is, the groove 25 changes a direction of the output light from the uncoupled waveguide 46 and an input light into the uncoupled waveguide 46 to a direction that is different from an extending direction of the Mach-Zehnder modulator.

Thus, the groove 25 acts as a suppresser that suppresses a power of the output light from the uncoupled waveguide 46 and the input light into the uncoupled waveguide 46 in the extending direction of the Mach-Zehnder modulator. In concrete, an inputting of a noise light to the uncoupled waveguide 46 is suppressed. And, re-mixing of the radiated light from the uncoupled waveguide 46 with a signal light is suppressed. Thus, the degradation of the extinction ratio can be suppressed. In the embodiment, the extending direction of the Mach-Zehnder modulator corresponds to the extending direction of the intermediate waveguides 22a, 23a, 22b and 23b. The power in the extending direction of the Mach-Zehnder modulator is a power component in the extending direction of the Mach-Zehnder modulator of a light power that is projected to a face which each intermediate waveguide of the Mach-Zehnder modulator forms.

The groove 25 may be perpendicular to the extending direction of the uncoupled waveguide 46. However, the groove 25 may be formed obliquely with respect to the extending direction of the uncoupled waveguide 46 as illustrated in FIG. 2C, in a case of suppressing a reflected returning light at the groove 25.

Figure 3:
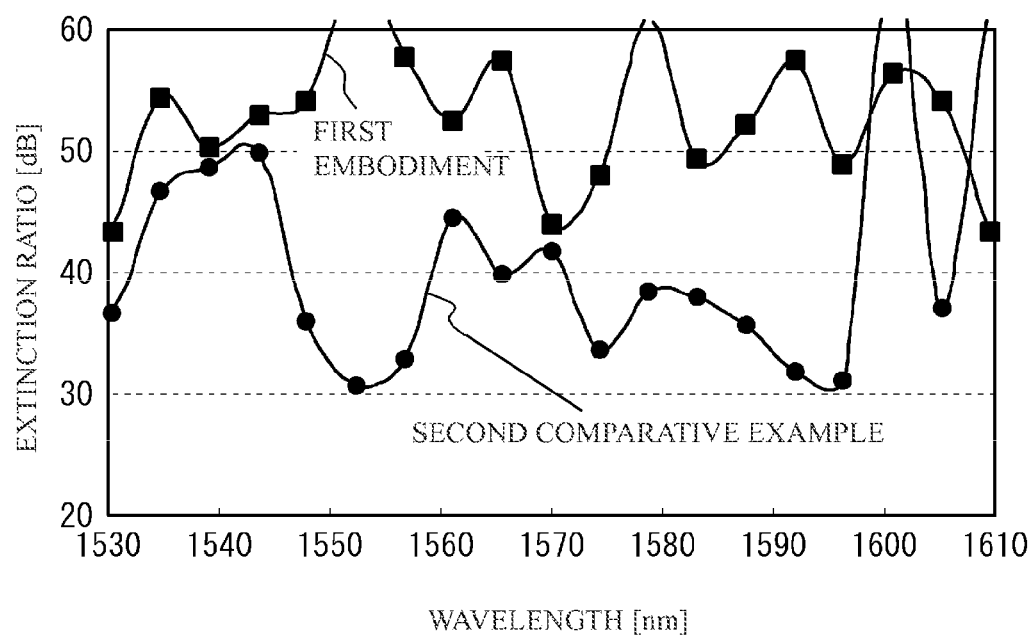
FIG. 3 illustrates an experimental result of an extinction ratio of an optical modulator.

FIG. 3 illustrates an experimental result of the extinction ratio of the optical modulator 100. For comparison, an experimental result of the extinction ratio of the optical modulator 200a in accordance with the second comparative example is illustrated. As illustrated in FIG. 3, in the optical modulator 100, the extinction ratio keeps a good value in a wider wavelength range than the optical modulator 200a.

Second Embodiment

FIG. 4A illustrates a schematic plane view for describing an optical modulator 100a in accordance with a second embodiment. As illustrated in FIG. 4A, the optical modulator 100a is different from the optical modulator 100 of FIG. 2A in a point that the groove 25 obliquely crosses the extending direction of an uncoupled waveguide. With the structure, a returning of a light reflected at the groove 25 can be suppressed.

Third Embodiment

FIG. 4B illustrates a schematic plane view for describing an optical modulator 100b in accordance with a third embodiment. As illustrated in FIG. 4B, the optical modulator 100b is different from the optical modulator 100 of FIG. 2A in a point that the groove 25 is not formed and a curved waveguide 26 is provided in an uncoupled waveguide of a 2×2 coupler that is open. The curved waveguide 26 is curved toward a direction that is different from the extending direction of the Mach-Zehnder modulator.

In the embodiment, the curved waveguide 26 changes the direction of the output light from the uncoupled waveguide 46 and the direction of the input light into the uncoupled waveguide 46 to a direction that is different from the extending direction of the Mach-Zehnder modulator. Thus, the curved waveguide 26 acts as a suppresser that suppresses a power of the output light from the uncoupled waveguide 46 and the input light into the uncoupled waveguide 46 in the extending direction of the Mach-Zehnder modulator. With the structure, it is possible to suppress the optical combining between the uncoupled waveguide 46 and an inputting/outputting fiber. It is preferable that the extending direction of the curved waveguide 26 extends toward a side face of the substrate 40, because it is possible to suppress the optical combining between the uncoupled waveguide 46 and the inputting/outputting fiber more. An end face of the substrate 40 is a face having an inputting end or an outputting end. An upper face and a lower face of the substrate 40 is a face having the buffer layer 41 and an opposite face. The side face of the substrate 40 is a face other than the end face, the upper face and the lower face. For example, the side face of the substrate 40 is at a right angle with the end face. It is preferable that an angle θ between the extending direction of the curved waveguide 26 and an end face of a chip is smaller than a total reflection angle in order to suppress a propagation in the chip of a radiated light from an open end.

Fourth Embodiment

It is preferable that a radius (R) of a curved waveguide is small in order to change a light direction with a small distance. However, when the R is small, the light radiates in the curved waveguide and a sufficient effect is not achieved. And so, in a fourth embodiment, a groove is formed along an outer circumference of a curved waveguide.

Figure 5A:
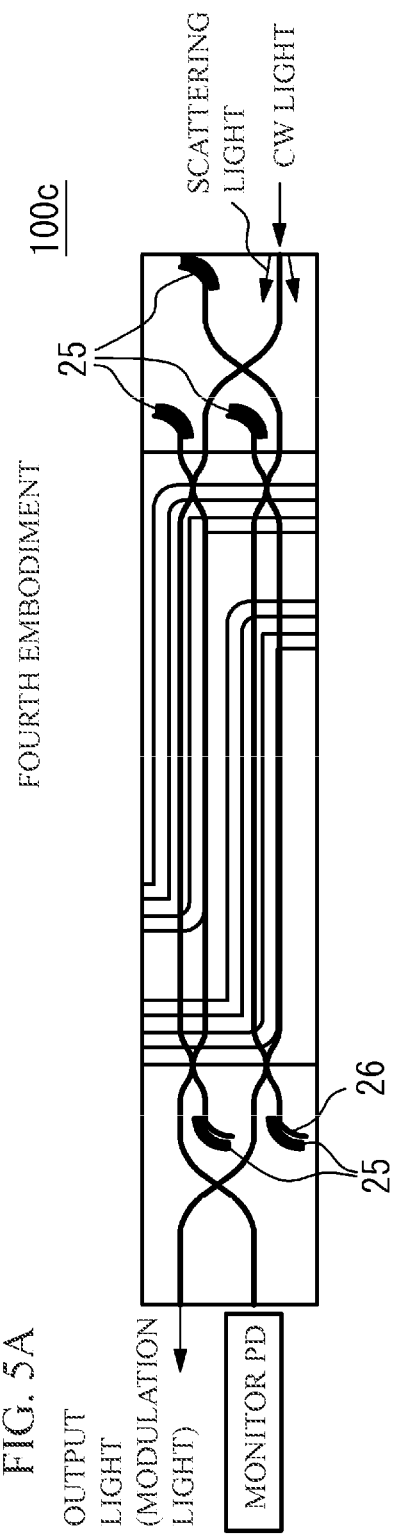
FIG. 5A illustrates a schematic plane view for describing an optical modulator in accordance with a fourth embodiment.
Figure 5B:
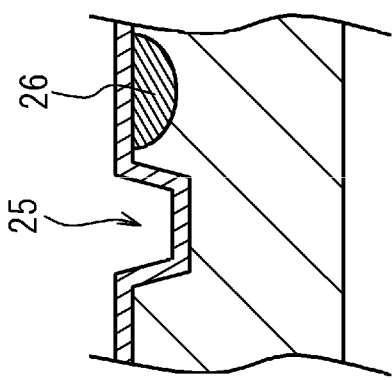
FIG. 5B illustrates a cross sectional view near an uncoupled waveguide.

FIG. 5A illustrates a schematic plane view for describing an optical modulator 100c in accordance with the fourth embodiment. FIG. 5B illustrates a cross sectional view near an uncoupled waveguide. As illustrated in FIG. 5A and FIG. 5B, the optical modulator 100c is different from the optical modulator 100b of FIG. 4B in a point that the groove 25 is formed along a circumference of the curved waveguide 26. With the structure, light radiation in the curved waveguide 26 can be suppressed, and the radius R of the curved waveguide 26 can be reduced.

Fifth Embodiment

Figure 6A:
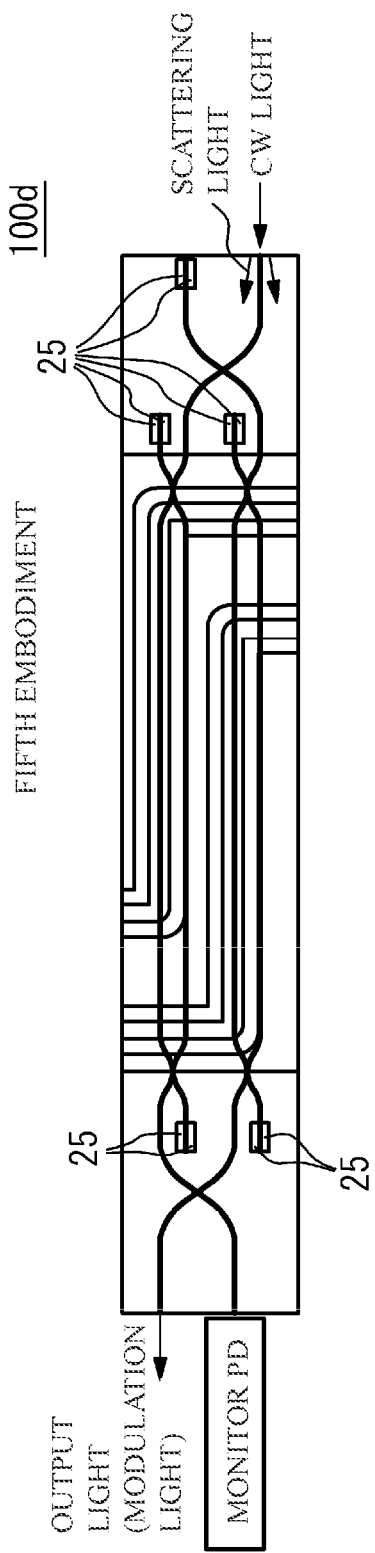
FIG. 6A illustrates a schematic plane view of an optical modulator in accordance with a fifth embodiment.
Figure 6B:
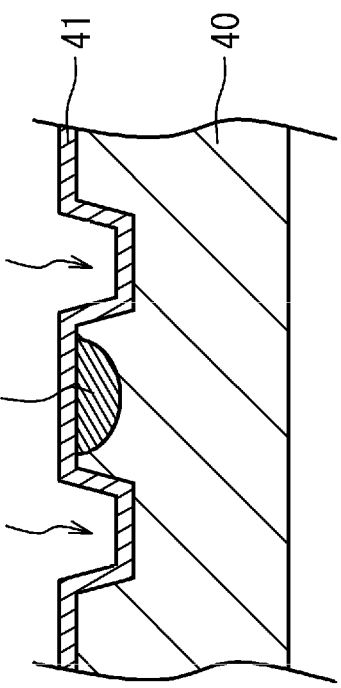
FIG. 6B illustrates a cross sectional view near an uncoupled waveguide.

FIG. 6A illustrates a schematic plane view for describing an optical modulator 100d in accordance with a fifth embodiment. FIG. 6B illustrates a cross sectional view near an uncoupled waveguide. As illustrated in FIG. 6A and FIG. 6B, the optical modulator 100d is different from the optical modulator 100 of FIG. 2A in a point that the groove 25 does not cross the uncoupled waveguide 46 but extends along the uncoupled waveguide 46. With the structure, an optical loss around an open end is enlarged by the groove 25. That is, the groove 25 absorbs at least a part of the output light from the uncoupled waveguide 46 and the input light into the uncoupled waveguide 46. Thus, the groove 25 acts as a suppresser that suppresses a power of the output light from the uncoupled waveguide 46 and the input light into the uncoupled waveguide 46 in the extending direction of the Mach-Zehnder modulator. In this case, a mode field is deformed, and a combining between the output light and the radiation light and between the input light and the radiation light. Thus, a mixing between the radiation light and a signal light is suppressed.

Sixth Embodiment

Figure 7A:
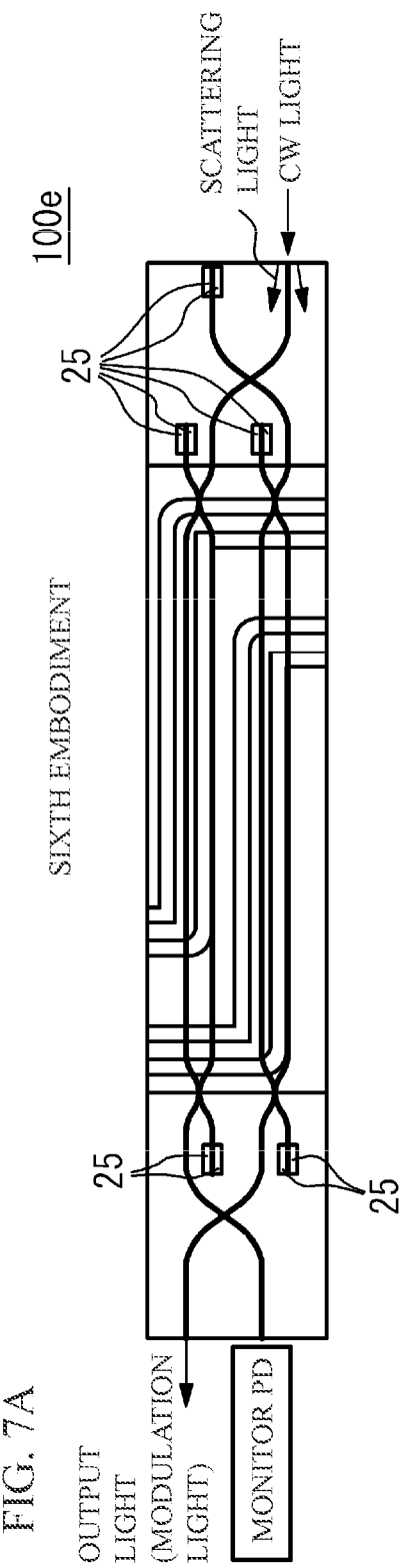
FIG. 7A illustrates a schematic plane view of an optical modulator in accordance with a sixth embodiment.
Figure 7B:
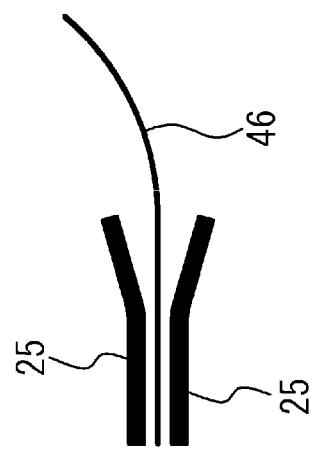
FIG. 7B illustrates a cross sectional view around am uncoupled waveguide.

In the optical modulator 100d of FIG. 6A, a scattering at a starting point of the groove 25 may have a bad influence. And so, a distance between the uncoupled waveguide 46 and the groove 25 around the starting point of the groove 25 may change continuously. FIG. 7A illustrates a schematic plane view of an optical modulator 100e in accordance with a sixth embodiment. FIG. 7B illustrates a cross sectional view around the uncoupled waveguide 46. As illustrated in FIG. 7A and FIG. 7B, the optical modulator 100e is different from the optical modulator 100c of FIG. 5A in a point that the groove 25 extends along the uncoupled waveguide 46 around an open end and the distance between the uncoupled waveguide 46 and the groove 25 around the starting point of the groove 25 decreases continuously. With the structure, an effect of a scattering at the starting point of the groove 25 can be suppressed.

Seventh Embodiment

Figure 8A:
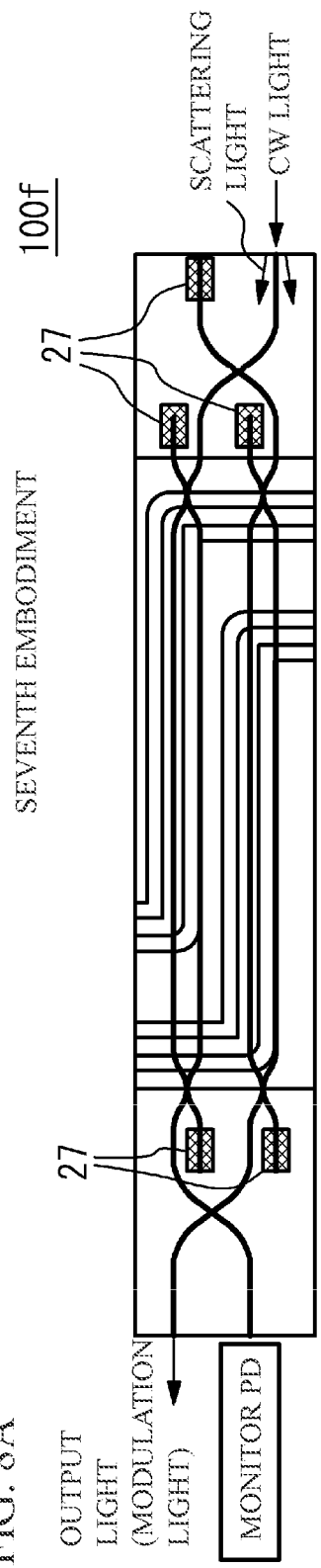
FIG. 8A illustrates a schematic plane view for describing an optical modulator in accordance with a seventh embodiment.
Figure 8B:
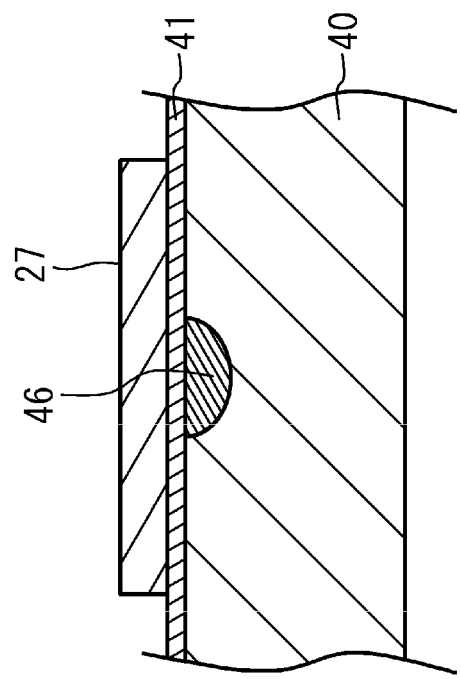
FIG. 8B illustrates a cross sectional view of an uncoupled waveguide.

FIG. 8A illustrates a schematic plane view for describing an optical modulator 100f in accordance with a seventh embodiment. FIG. 8B illustrates a cross sectional view of an uncoupled waveguide. As illustrated in FIG. 8A and FIG. 8B, the optical modulator 100f is different from the optical modulator 100 of FIG. 2A in a point that an optical absorption member 27 is provided on the buffer layer 41 above a waveguide around an open end in order to enlarge optical loss.

The optical absorption member 27 absorbs a light propagating in the uncoupled waveguide 46. Thus, the optical absorption member 27 acts as a suppresser that suppresses a power of the output light from the uncoupled waveguide 46 and the input light into the uncoupled waveguide 46 in the extending direction of the Mach-Zehnder modulator. A semiconductor, a metal material or the like can be used as the optical absorption member 27. The material of the optical absorption member 27 may be the same as the material of the single electrodes 42 and 44 and the ground electrodes 43 and 45. In this case, it is possible to form the signal electrodes 42 and 44, the ground electrodes 43 and 45 and the optical absorption member 27 in a single process. That is, a cost can be reduced.

Eighth Embodiment

Figure 9A:
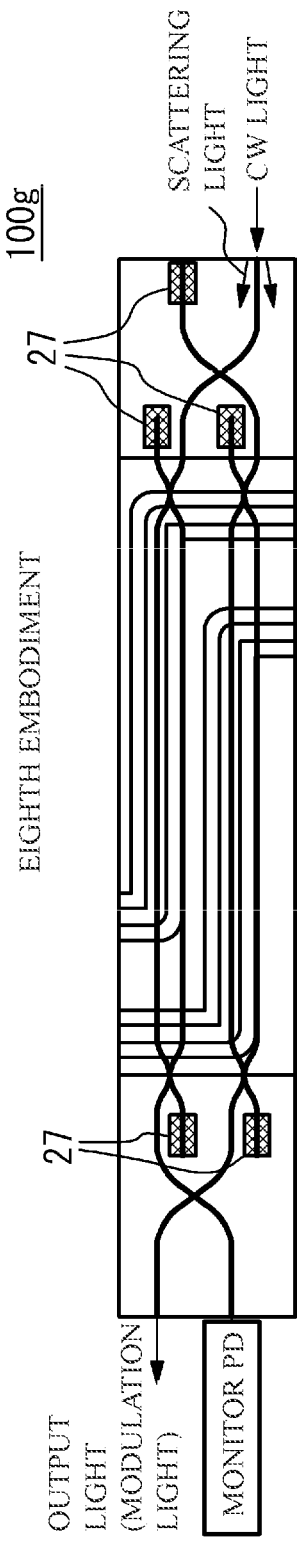
FIG. 9A illustrates a schematic plane view for describing an optical modulator in accordance with an eighth embodiment.
Figure 9B:
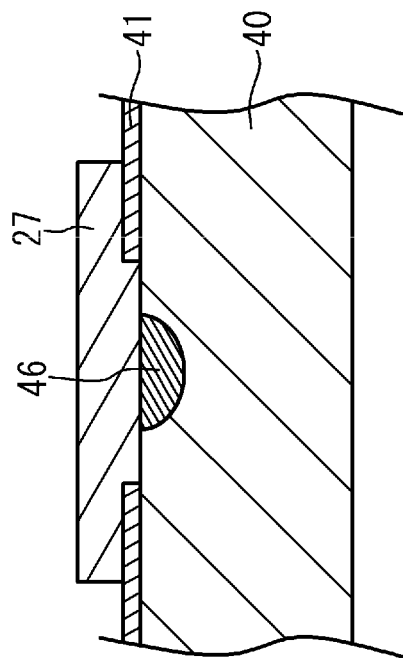
FIG. 9B illustrates a cross sectional view around an uncoupled waveguide.

FIG. 9A illustrates a schematic plane view for describing an optical modulator 100g in accordance with an eighth embodiment. FIG. 9B illustrates a cross sectional view around an uncoupled waveguide. As illustrated in FIG. 9A and FIG. 9B, the optical modulator 100g is different from the optical modulator 100f of FIG. 8A in a point that the buffer layer 41 is not provided between the optical absorption member 27 and the uncoupled waveguide 46. With the structure, the loss caused by the optical absorption member 27 can be enlarged.

Ninth Embodiment

FIG. 10A illustrates a schematic plane view for describing an optical modulator 100h in accordance with a ninth embodiment. FIG. 10B illustrates a cross sectional view around an uncoupled waveguide. As illustrated in FIG. 10A and FIG. 10B, the optical modulator 100h is different from the optical modulator 100d of FIG. 6A in a point that the optical absorption member 27 is provided on the uncoupled waveguide 46 and covers the groove 25. With the structure, the loss at the groove 25 and the optical absorption member 27 can be enlarged. It is preferable that the buffer layer 41 is not provided between the optical absorption member 27 and the uncoupled waveguide 46.

Example of Optical Transmitter

Figure 11:
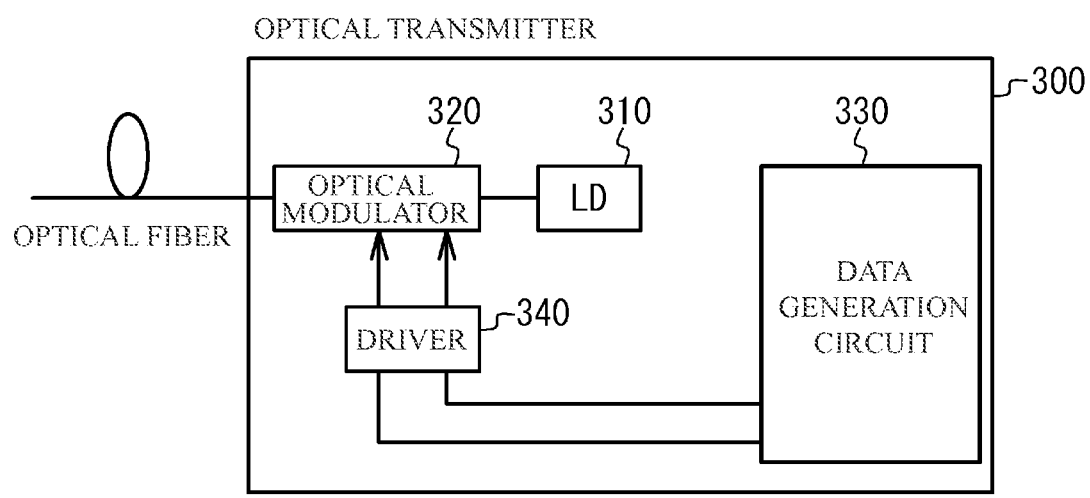
FIG. 11 illustrates a block diagram of an overall structure of an optical transmitter.

FIG. 11 illustrates a block diagram of an overall structure of an optical transmitter 300. As illustrated in FIG. 11, the optical transmitter 300 has a light-emitting element 310, an optical modulator 320, a data generation circuit 330, a driver 340 and so on. The light-emitting element 310 is a semiconductor laser or the like. The optical modulator 320 is any one of the above-mentioned optical modulators. The data generation circuit 330 generates a signal data that is output by the optical transmitter 300. The driver 340 drives the optical modulator 320 so that the signal data generated by the data generation circuit 330 is achieved. An optical modulation signal output by the optical transmitter 300 is output outside through an optical fiber or the like. The optical modulator 320 has a high extinction ratio. Therefore, the optical transmitter 300 may output a high property optical signal.

In the above-mentioned embodiments, two Mach-Zehnder modulators are provided in parallel with each other. However, the number of the Mach-Zehnder modulator may be one. In this case, a suppresser has only to be provided in order to suppress a power of an output light from at least one of uncoupled waveguides of a 2×2 coupler acting as a splitter and a combiner and an input light into the uncoupled waveguide in an extending direction of a Mach-Zehnder modulator. Three or more Mach-Zehnder modulators may be provided. In this case, a suppresser has only to be provided in order to suppress a power of an output light from at least one of uncoupled waveguides of any one of 2×2 couplers acting as a splitter and a combiner and an input light into the uncoupled waveguide in an extending direction of a Mach-Zehnder modulator. When a plurality of 2×2 couplers acting as a splitter or a combiner are provided, the above-mentioned suppresser has only to be provided in an uncoupled waveguide of at least one of the 2×2 couplers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical modulator having a 2×2 coupler comprising:
   a substrate that has electrooptical effect and has a Mach-Zehnder modulator that has a 2×2 coupler acting as a splitter, two intermediate waveguides coupled to outputting waveguides of the splitter and another 2×2 coupler acting as a combiner coupled to the two intermediate waveguides; and
   a suppresser that suppresses a power of an output light from an uncoupled waveguide that is under an open condition by being coupled to no waveguide and an input light into the uncoupled waveguide of at least one of the 2×2 couplers in an extending direction of the Mach-Zehnder modulator.

2. The optical modulator as claimed in claim 1, wherein the suppresser changes a direction of at least a part of the output light from the uncoupled waveguide and the input light into the uncoupled waveguide to a direction that is different from the extending direction of the Mach-Zehnder modulator.

3. The optical modulator as claimed in claim 2, wherein:
   the suppresser is a groove formed in the substrate; and
   the groove crosses an open end of the uncoupled waveguide.

4. The optical modulator as claimed in claim 3, wherein the groove is obliquely formed with respect to an extending direction of the uncoupled waveguide.

5. The optical modulator as claimed in claim 2, wherein the suppresser is a curved waveguide curving toward a direction that is different from the extending direction of the Mach-Zehnder modulator.

6. The optical modulator as claimed in claim 5, wherein the extending direction of the curved waveguide is directed toward a side face of the substrate.

7. The optical modulator as claimed in claim 1, wherein the suppresser absorbs at least a part of the output light from the uncoupled waveguide and the input light into the uncoupled waveguide.

8. The optical modulator as claimed in claim 7, wherein:
   the suppresser is a groove formed in the substrate; and
   the groove is formed along the uncoupled waveguide.

9. The optical modulator as claimed in claim 7, wherein the suppresser is an optical absorption member provided on the uncoupled waveguide.

10. An optical modulator having a 2×2 coupler comprising:
    a substrate that has electrooptical effect and has a plurality of Mach-Zehnder modulators that have a 2×2 coupler acting as a splitter, two intermediate waveguides coupled to outputting waveguides of the splitter and a 2×2 coupler acting as a combiner coupled to the two intermediate waveguides, a 2×2 coupler that is coupled to the splitter of the Mach-Zehnder modulators and a 2×2 coupler that is coupled to the combiner of the Mach-Zehnder modulators; and
    a suppresser that suppresses a power of an output light from an uncoupled waveguide that is under an open condition by being coupled to no waveguide and an input light into the uncoupled waveguide of at least one of the 2×2 couplers in an extending direction of the Mach-Zehnder modulator.

11. The optical modulator as claimed in claim 6, wherein an angle between the extending direction of the curved waveguide and the side face of the substrate is smaller than an angle of total reflection.

12. The optical modulator as claimed in claim 8, wherein a distance between the groove and the uncoupled waveguide continuously becomes larger toward an open end of the uncoupled waveguide.

* * * * *